(12) United States Patent
Hoshika et al.

(10) Patent No.: US 12,141,368 B2
(45) Date of Patent: Nov. 12, 2024

(54) ELECTRONIC DEVICE

(71) Applicant: Panasonic Intellectual Property Management Co., Ltd., Osaka (JP)

(72) Inventors: Naoki Hoshika, Osaka (JP); Tetsuya Adachi, Hyogo (JP); Tatsuo Kuromoto, Osaka (JP); Riho Fukagawa, Osaka (JP); Keita Endo, Osaka (JP); Shintarou Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 236 days.

(21) Appl. No.: 17/686,648

(22) Filed: Mar. 4, 2022

(65) Prior Publication Data
US 2022/0187925 A1 Jun. 16, 2022

Related U.S. Application Data

(63) Continuation of application No. PCT/JP2020/032536, filed on Aug. 28, 2020.

(30) Foreign Application Priority Data

Sep. 11, 2019 (JP) .................. 2019-165516

(51) Int. Cl.
G06F 3/02 (2006.01)
(52) U.S. Cl.
CPC .................. G06F 3/0202 (2013.01)

(58) Field of Classification Search
CPC ..... G06F 3/0202; G06F 1/1616; G06F 1/1662
See application file for complete search history.

(56) References Cited

U.S. PATENT DOCUMENTS 6,166,916 A * 12/2000 Jelinger ............... H05K 7/1417
206/706
6,181,390 B1 * 1/2001 Wang ................ G02F 1/133308
349/59

(Continued)

FOREIGN PATENT DOCUMENTS

CN 1445805 A 10/2003
CN 2646779 Y 10/2004

(Continued)

OTHER PUBLICATIONS

Thomas Baart, "Cheat sheet: Custom keyboard mounting styles," Thomas Baart. Apr. 8, 2019. Dec. 14, 2023 [https://web.archive.org/web/20190423140315/https://thomasbaart.nl/2019/04/07/cheat-sheet-custom-keyboard-mounting-styles/] ( Year: 2019).*

(Continued)

*Primary Examiner* — Rockshana D Chowdhury
*Assistant Examiner* — Keon Nmn Kim
(74) *Attorney, Agent, or Firm* — Renner, Otto, Boisselle & Sklar, LLP

(57) ABSTRACT

An electronic device of the present disclosure includes a body unit, and a keyboard unit disposed on the body unit. The keyboard unit includes a keyboard, a housing that has a frame shape and houses the keyboard, and a plurality of retainers connected to the housing to retain the keyboard. A plurality of retainers are formed of a material having a specific rigidity higher than that of the housing.

7 Claims, 6 Drawing Sheets

(56) References Cited

U.S. PATENT DOCUMENTS

| | | | | |
|---|---|---|---|---|
| 6,362,968 | B1* | 3/2002 | Lajara | H05K 7/1461 |
| | | | | 361/752 |
| 6,966,617 | B2* | 11/2005 | Chen | H05K 5/02 |
| | | | | 348/836 |
| 7,515,403 | B2* | 4/2009 | Hong | G02F 1/133308 |
| | | | | 361/679.22 |
| 8,611,100 | B2* | 12/2013 | Kuo | G02F 1/133308 |
| | | | | 361/752 |
| 8,749,728 | B2* | 6/2014 | Zhang | G02F 1/133308 |
| | | | | 349/58 |
| 9,164,180 | B2* | 10/2015 | Tateishi | G01T 1/16 |
| 2002/0048148 | A1 | 4/2002 | Horiuchi | |
| 2003/0173201 | A1 | 9/2003 | Ohashi | |
| 2011/0286163 | A1 | 11/2011 | Abe | |
| 2019/0091946 | A1* | 3/2019 | Lancaster-Larocque | |
| | | | | B29C 70/541 |

FOREIGN PATENT DOCUMENTS

| | | |
|---|---|---|
| CN | 201662739 U | 12/2010 |
| JP | 2002-149268 A | 5/2002 |
| JP | 2008-299533 A | 12/2008 |
| JP | 2011-248412 A | 12/2011 |

OTHER PUBLICATIONS

International Search Report for corresponding Application No. PCT/JP2020/032536, mailed Nov. 2, 2020.
English Translation of Chinese Office Acion dated Nov. 7, 2023 for the related Chinese Patent Application No. 202080063600.6.

* cited by examiner

ELECTRONIC DEVICE

TECHNICAL FIELD

The present disclosure relates to an electronic device.

BACKGROUND ART

As an electronic device, for example, a notebook personal computer is known (see, for example, PTL 1).

The electronic device described in PTL 1 includes a main body, a keyboard unit disposed at a place for a keyboard to be provided on the main body, and a film member disposed between the main body and the keyboard unit. The film member includes a flexible film sheet, a main body side adhesive portion by which the film sheet is bonded to the main body, and a keyboard side adhesive portion by which the film sheet is bonded to the keyboard unit.

CITATION LIST

Patent Literature

PTL 1: Unexamined Japanese Patent Publication No. 2008-299533

SUMMARY

In recent years, reduction in weight of electronic devices have been required.

An electronic device according to the present disclosure includes
 a body unit, and
 a keyboard unit disposed on the body unit,
 where the keyboard unit includes
 a keyboard,
 a housing that has a frame shape and houses the keyboard, and
 a plurality of retainers connected to the housing and configured to retain the keyboard, and
 a plurality of retainers are formed of a material having a specific rigidity higher than a specific rigidity of the housing.

The present disclosure enables weight reduction of electronic devices.

DESCRIPTION OF EMBODIMENTS

Background to the Present Disclosure

Figure 1:
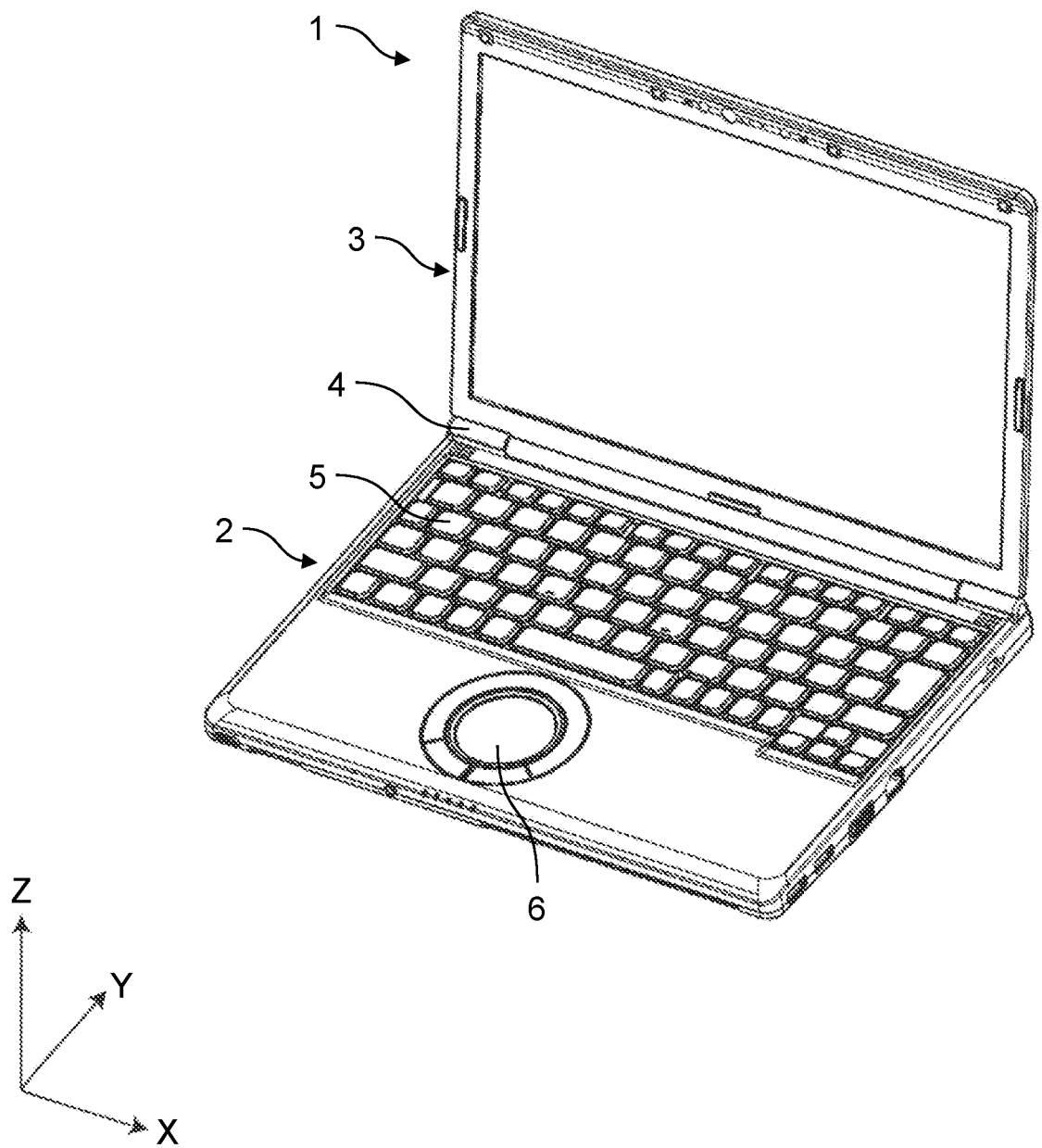
FIG. 1 is a schematic view illustrating an example of an electronic device of a first exemplary embodiment according to the present disclosure.

In an electronic device such as a notebook computer (laptop personal computer (PC)), a keyboard unit includes a keyboard and a housing that houses the keyboard. The housing includes, for example, a flat plate-shaped base and a frame-shaped base frame provided on the outer periphery of the base. The keyboard is disposed on the base so as to be surrounded by the base frame, whereby the keyboard is retained.

The housing of the keyboard unit is made of, for example, a metal material such as a magnesium (Mg) alloy. Thus, the weight of the housing mainly determines the weight of the keyboard unit.

The inventors of the present disclosure have found a configuration that can reduce the weight of a keyboard unit. In this configuration, a housing is formed in a frame shape, and a keyboard is retained by retainers formed of a material having a specific rigidity higher than that of the housing. The present disclosure will be described below.

An electronic device according to a first aspect of the present disclosure includes
 a body unit, and
 a keyboard unit disposed on the body unit,
 where the keyboard unit includes
 a keyboard,
 a housing that has a frame shape and houses the keyboard, and
 a plurality of retainers connected to the housing and configured to retain the keyboard, and
 a plurality of retainers is formed of a material having a specific rigidity higher than a specific rigidity of the housing.

This configuration enables weight reduction.

In an electronic device according to a second aspect of the present disclosure,
 each of a plurality of the retainers has a plate shape having a longitudinal direction, and
 a plurality of retainers are arranged at an interval smaller than a key pitch of the keyboard.

This configuration enables further weight reduction of the electronic device.

In an electronic device according to a third aspect of the present disclosure,
 the longitudinal direction of a plurality of retainers intersects a longitudinal direction of the keyboard.

This configuration enables weight reduction while firmly retaining the keyboard.

In an electronic device according to a fourth aspect of the present disclosure, a length in a lateral direction of each of a plurality of retainers is smaller than a width dimension or a depth dimension of a key of the keyboard.

This configuration enables further weight reduction of the electronic device.

In an electronic device according to a fifth aspect of the present disclosure,
a plurality of retainers are connected to the housing by screws.

This configuration enables firmly connecting a plurality of the retainers to the housing.

In an electronic device according to a sixth aspect of the present disclosure,
the housing includes
a base frame having a frame shape, and
one or more internal frames formed on an inner wall of the base frame, a plurality of retainers being disposed across the one or more internal frames.

This configuration enables weight reduction while firmly retaining the keyboard.

In an electronic device according to a seventh aspect of the present disclosure,
a material of a plurality of retainers is a fiber reinforced plastic.

This configuration enables further weight reduction of the electronic device.

Hereinafter, exemplary embodiments of the present disclosure will be described with reference to the accompanying drawings. In each drawing, elements are exaggerated in order to facilitate explanation.

First Exemplary Embodiment

General Structure

FIG. 1 is a schematic view illustrating an example of electronic device 1 of a first exemplary embodiment according to the present disclosure. Note that X, Y, and Z directions in the drawings respectively indicate a width direction, a depth direction, and a height direction of electronic device 1. As illustrated in FIG. 1, electronic device 1 is a notebook personal computer (laptop PC). Electronic device 1 includes body unit 2 and display unit 3. Body unit 2 and display unit 3 are connected to each other via hinge 4.

Body Unit

Body unit 2 is an electronic device main body on which a main board is mounted. A central processing unit (CPU), a read-only memory (ROM), a random access memory (RAM), a chip set, a clock generator, various connectors, and the like are mounted on the main board.

Body unit 2 has a thin box-shaped outer shell. Keyboard unit 5 and touch pad 6 are disposed on the upper side of body unit 2.

Display Unit

Display unit 3 includes a display device such as a liquid crystal display (LCD). Display unit 3 is attached to body unit 2 so as to be rotatable about hinge 4.

Keyboard Unit

Figure 2:
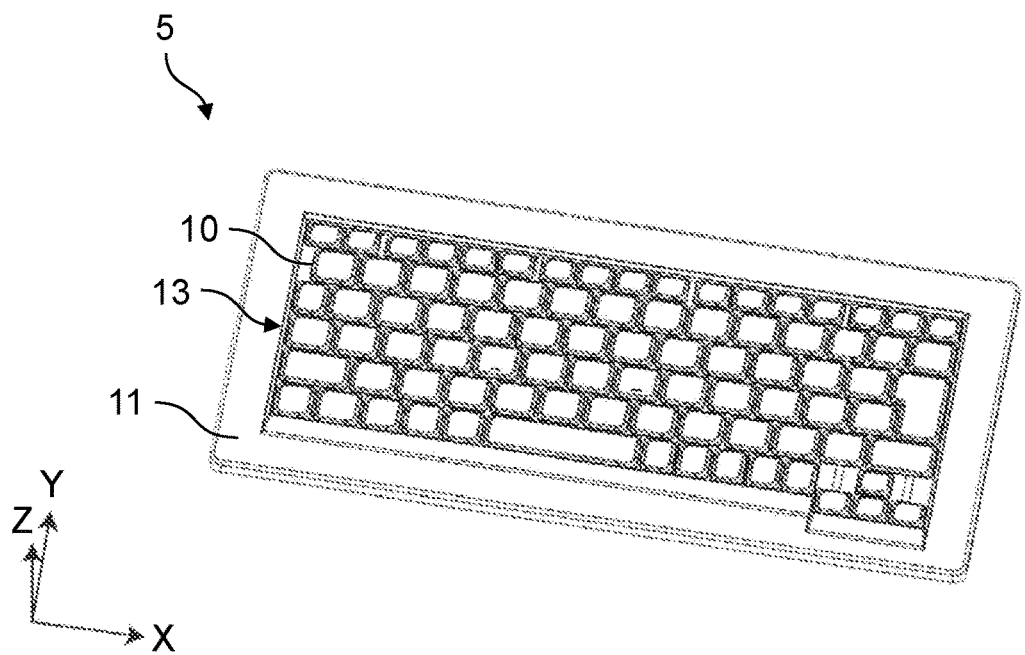
FIG. 2 is a schematic perspective view of an example of a keyboard unit of the first exemplary embodiment according to the present disclosure as viewed from a front side.
Figure 3:
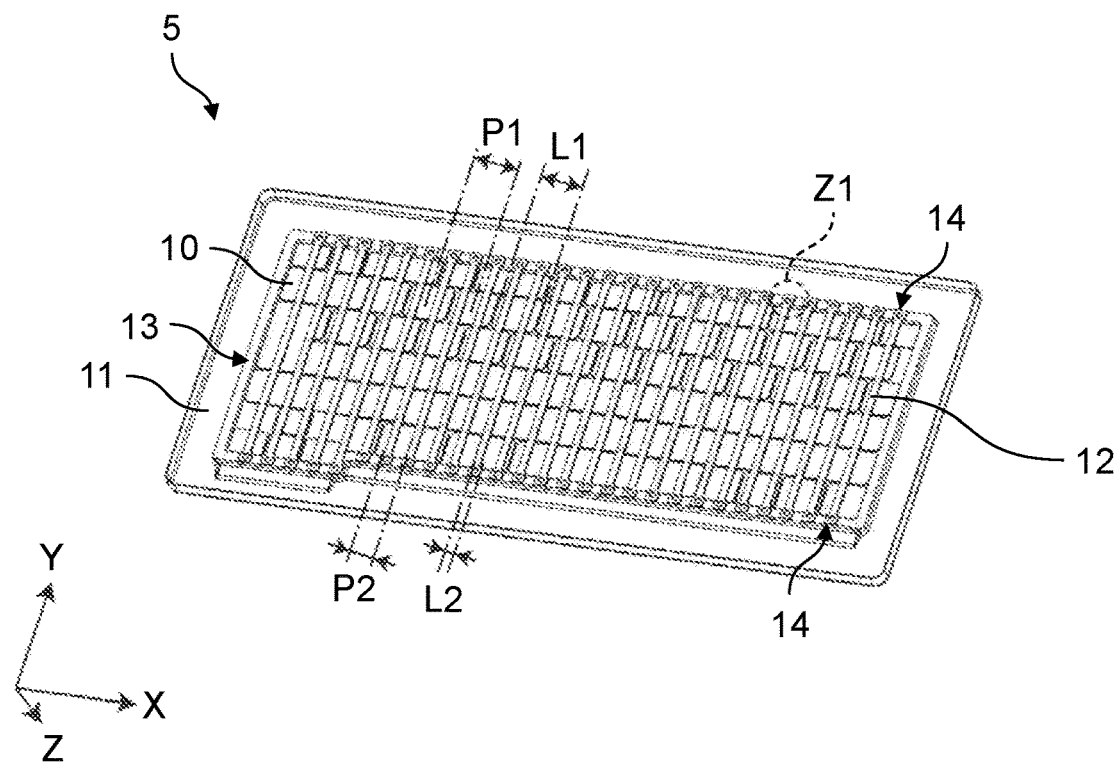
FIG. 3 is a schematic perspective view of an example of the keyboard unit of the first exemplary embodiment according to the present disclosure as viewed from a back side.

FIG. 2 is a schematic perspective view of an example of keyboard unit 5 of the first exemplary embodiment according to the present disclosure as viewed from a front side. FIG. 3 is a schematic perspective view of an example of keyboard unit 5 of the first exemplary embodiment according to the present disclosure as viewed from a back side. As illustrated in FIGS. 2 and 3, keyboard unit 5 includes keyboard 10, housing 11 that houses keyboard 10, and a plurality of retainers 12 that are attached to housing 11 and retain keyboard 10.

Keyboard 10 has a plurality of keys. A plurality of keys include, for example, a plurality of character keys, a plurality of function keys, a space key, an enter key, a shift key, a control key, and the like. A plurality of keys are arranged at predetermined key pitch P1 in the width direction (X direction) of keyboard unit 5. Key pitch P1 means the distance between the centers of two adjacent keys. In the first exemplary embodiment, key pitch P1 means the distance between the centers of two adjacent character keys among the plurality of character keys.

Keyboard 10 is formed in a rectangular thin plate shape. Specifically, keyboard 10 has a longitudinal direction that is the width direction (X direction) of keyboard unit 5 and a lateral direction that is the depth direction (Y direction) of keyboard unit 5.

Housing 11 is a frame that houses keyboard 10. Housing 11 is formed in a rectangular frame shape. Specifically, housing 11 has a longitudinal direction that is the width direction (X direction) of keyboard unit 5 and a lateral direction that is the depth direction (Y direction) of keyboard unit 5.

One through hole 13 is provided in the inner portion of housing 11. Through hole 13 is formed larger than the outer shape of keyboard 10. Through hole 13 is formed in, for example, a rectangular shape. Keyboard 10 is disposed in a space formed of through hole 13 of housing 11. That is, keyboard 10 is disposed within the frame of housing 11.

Housing 11 is formed of a metal material such as Mg alloy.

The plurality of retainers 12 are connected to housing 11. The plurality of retainers 12 are disposed at a place on housing 11 where through hole 13 is formed so as to retain keyboard 10.

Each of the plurality of retainers 12 is formed in a plate shape having a longitudinal direction. The longitudinal direction of the plurality of retainers 12 intersects the longitudinal direction of keyboard 10. In the first exemplary embodiment, the longitudinal direction of the plurality of retainers 12 is orthogonal to the longitudinal direction of keyboard 10 and is parallel to the depth direction (Y direction) of keyboard unit 5.

The plurality of retainers 12 are arranged at an interval along the width direction (X direction) of keyboard unit 5, that is, the longitudinal direction of keyboard 10. The plurality of retainers 12 are arranged at interval P2 smaller than key pitch P1 in the longitudinal direction of keyboard 10. Accordingly, each of a plurality of keys of keyboard 10 is retained by at least one retainer 12. As a result, keyboard 10 can be retained firmly, and the quality of key touch can be improved. That is, the feeling with which a user presses a key can be improved.

Length L2 in the lateral direction of each of the plurality of retainers 12 is smaller than width dimension L1 of a key of keyboard 10. In the first exemplary embodiment, width dimension L1 of a key of keyboard 10 is the dimension in the width direction (X direction) of a character key. This enables weight reduction of retainers 12 while firmly retaining keyboard 10.

Through hole 14 is provided at each of both ends of each of the plurality of retainers 12. A screw for connecting retainer 12 to housing 11 is inserted in through hole 14.

Figure 4:
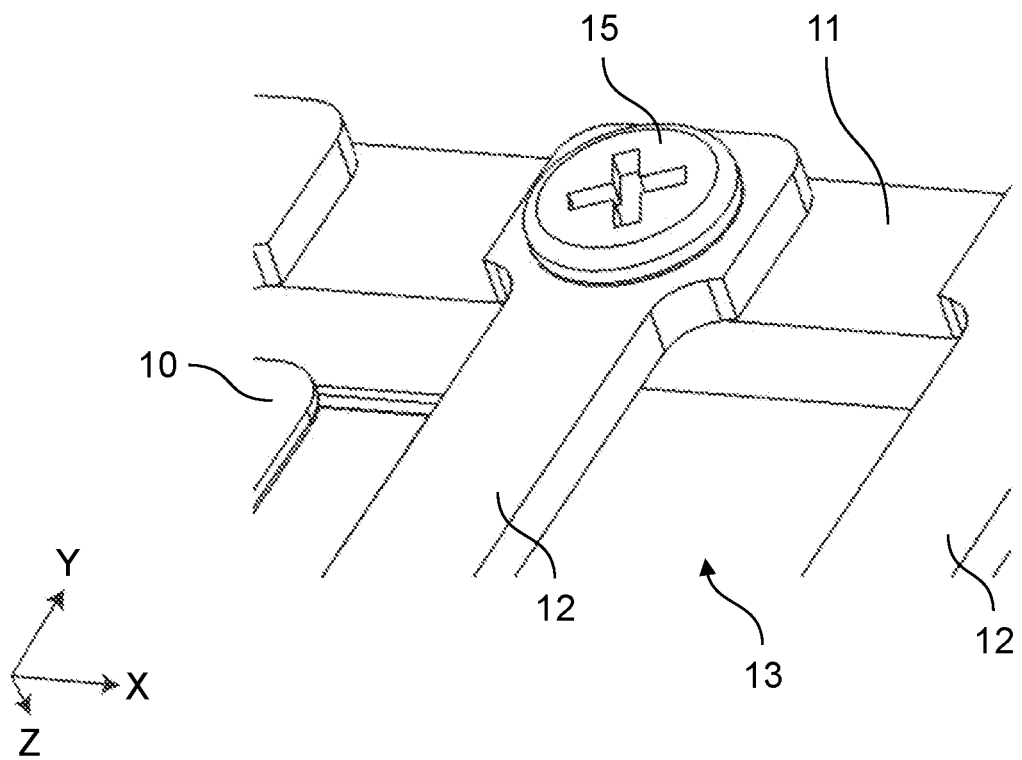
FIG. 4 is a schematic enlarged view in which portion Z1 of the keyboard unit in FIG. 3 is enlarged.
Figure 5:
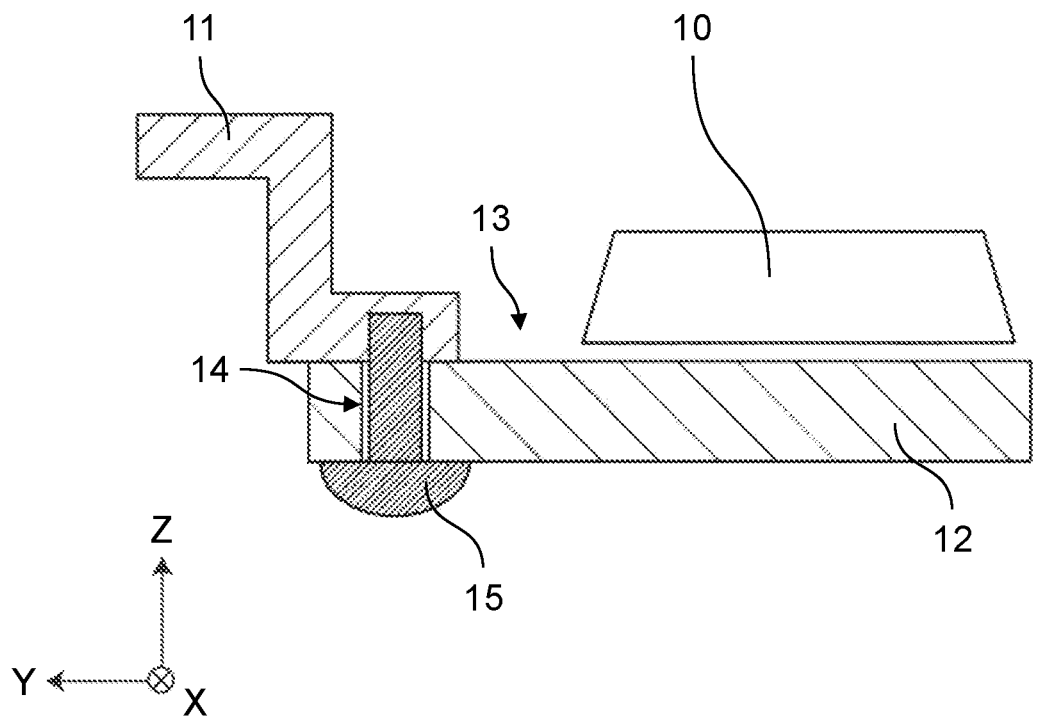
FIG. 5 is a schematic view illustrating an example of connection between a housing and a retainer of the first exemplary embodiment according to the present disclosure.

FIG. 4 is a schematic enlarged view in which portion Z1 of keyboard unit 5 in FIG. 3 is enlarged. FIG. 5 is a schematic view illustrating an example of connection between housing 11 and retainer 12 of the first exemplary embodiment according to the present disclosure. As illustrated in FIGS. 4 and 5, through hole 14 is provided at each of both ends of retainer 12. Screw 15 for connecting housing 11 and retainer 12 is inserted in through hole 14. As described above, in the first exemplary embodiment, the plurality of retainers 12 are connected to housing 11 by screws 15. This enables the plurality of retainers 12 to retain keyboard 10 firmly.

The plurality of retainers 12 are formed of a material having a specific rigidity higher than that of housing 11. Here, "having specific rigidity higher than that of housing 11" means that the rigidity per weight is higher than that of housing 11. That is, the specific rigidity (rigidity per weight) of the material of the plurality of retainers 12 is higher than the specific rigidity of housing 11. In the first exemplary embodiment, a material forming the plurality of retainers 12 is a fiber reinforced plastic (FRP), and has a specific rigidity higher than the specific rigidity of a metal material such as Mg alloy. The fiber reinforced plastic preferably has anisotropy in tensile strength. Specifically, the direction of fibers of the fiber reinforced plastic is preferably along the longitudinal direction of retainer 12. That is, retainer 12 is preferably configured such that the tensile strength of retainer 12 in the longitudinal direction is larger than the tensile strength of retainer 12 in the lateral direction (direction orthogonal to the longitudinal direction). This enables improvement of the tensile strength of retainer 12 in the longitudinal direction. In the first exemplary embodiment, the fiber reinforced plastic is formed by laminating a plurality of fiber layers.

As described above, by forming the plurality of retainers 12 with a material having a specific rigidity higher than that of housing 11, the weight of keyboard unit 5 can be reduced. In addition, the plurality of retainers 12 can retain keyboard 10 firmly.

Effects

Electronic device 1 of the first exemplary embodiment can exhibit effects below.

Electronic device 1 includes body unit 2 and keyboard unit 5 disposed on body unit 2. Keyboard unit 5 includes keyboard 10, housing 11 that houses keyboard 10, and the plurality of retainers 12 connected to housing 11 to retain keyboard 10. The plurality of retainers 12 are formed of a material having a specific rigidity higher than that of housing 11.

As described above, housing 11 is formed in a frame shape, and keyboard 10 is retained by the plurality of retainers 12 formed of a material having a specific rigidity higher than that of housing 11. This enables weight reduction of electronic device 1 while firmly retaining keyboard 10.

Keyboard unit 5 is a device to which a load is applied by a user directly hitting a key. Thus, in terms of the quality of keyboard unit 5, improvement in the feeling with which a user hits a key, that is, the quality of key touch is required. The quality of key touch is affected by firmness of housing 11. Electronic device 1 is advantageous also in terms of improvement of the quality of key touch, since keyboard 10 can be retained firmly by the plurality of retainers 12.

Each of the plurality of retainers 12 is formed in a plate shape having a longitudinal direction. The plurality of retainers 12 are arranged at interval P2 smaller than key pitch P1 of keyboard 10. With this configuration, each of a plurality of keys of keyboard 10 is retained by at least one retainer 12. This enables weight reduction while firmly retaining keyboard 10.

The longitudinal direction of the plurality of retainers 12 intersects the longitudinal direction of keyboard 10. Length L2 in the lateral direction of each of the plurality of retainers 12 is smaller than width dimension L1 of a key of keyboard 10. This configuration enables weight reduction while firmly retaining keyboard 10.

The plurality of retainers 12 are connected to housing 11 by screws 15. This configuration enables firmly connecting the plurality of retainers 12 to housing 11. This enables the plurality of retainers 12 to firmly retain keyboard 10.

In the first exemplary embodiment, the example in which the longitudinal direction of the plurality of retainers 12 is orthogonal to the longitudinal direction of keyboard 10 has been described, but the present disclosure is not limited to this configuration. The longitudinal direction of the plurality of retainers 12 may obliquely intersect the longitudinal direction of keyboard 10. Alternatively, the longitudinal direction of the plurality of retainers 12 may be parallel to the longitudinal direction of keyboard 10.

In the first exemplary embodiment, the example in which the plurality of retainers 12 are arranged at interval P2 smaller than key pitch P1 of keyboard 10 has been described, but the present disclosure is not limited to this configuration. Required of keyboard 10 is that each of a plurality of keys of keyboard 10 is retained by at least one retainer 12. Thus, some of the plurality of retainers 12 may be arranged at an interval larger than key pitch P1 of keyboard 10. For example, the plurality of retainers 12 may be randomly arranged.

In the first exemplary embodiment, the example in which length L2 in the lateral direction of each of the plurality of retainers 12 is smaller than width dimension L1 of a key of keyboard 10 has been described, but the present disclosure is not limited to this configuration. Required of keyboard 10 is that each of a plurality of keys of keyboard 10 is retained by at least one retainer 12. Thus, length L2 in the lateral direction of each of the plurality of retainers 12 may be larger than width dimension L1 of a key of keyboard 10.

In the first exemplary embodiment, the example in which the material forming the plurality of retainers 12 is a fiber reinforced plastic (FRP) has been described, but the material is not limited to an FRP. The material forming the plurality of retainers 12 may be any material having a specific rigidity higher than that of the material forming housing 11. For example, the material forming the plurality of retainers 12 may be a carbon fiber reinforced plastic (CFRP). With such a configuration, a rigidity higher than that of the reinforced fiber plastic can be obtained. Alternatively, the material forming the plurality of retainers 12 may be a nonwoven fabric.

In the first exemplary embodiment, the example in which the fiber reinforced plastic forming the plurality of retainers 12 is formed by laminating a plurality of plate-shaped fiber layers has been described, but the present disclosure is not limited to this configuration. The fiber reinforced plastic forming the plurality of retainers 12 may include a foamed resin layer between fiber layers.

In the first exemplary embodiment, the example in which the plurality of retainers 12 are connected to housing 11 by screws 15 has been described, but the present disclosure is not limited to this configuration. The plurality of retainers 12 may be connected to housing 11 by members other than screws 15.

Figure 6:
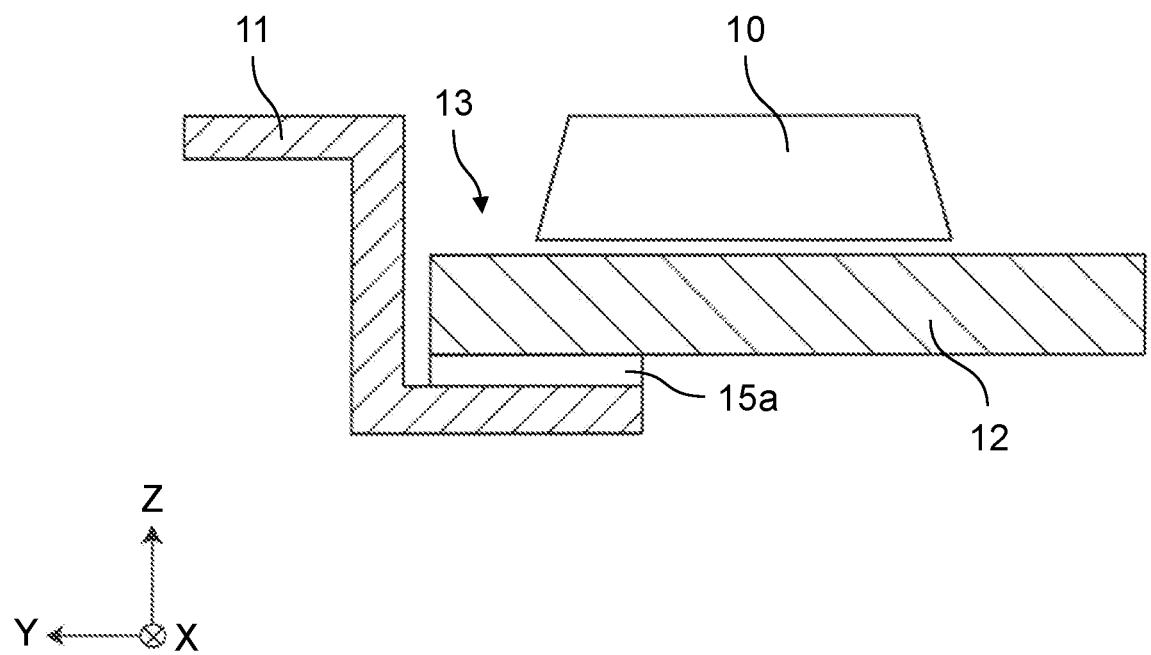
FIG. 6 is a schematic view illustrating an example of connection between the housing and the retainer of the first exemplary embodiment according to the present disclosure.

FIG. 6 is a schematic view illustrating another example of connection between housing 11 and retainer 12 of the first exemplary embodiment according to the present disclosure. As illustrated in FIG. 6, adhesive member 15a may be disposed between housing 11 and retainer 12 so that housing 11 and retainer 12 are connected by adhesive member 15a. Adhesive member 15a is, for example, a double-sided tape or an adhesive. Housing 11 and retainer 12 can be connected also with this configuration.

Second Exemplary Embodiment

An electronic device according to a second exemplary embodiment of the present disclosure will be described. The second exemplary embodiment will be described mainly on the points different from the first exemplary embodiment. In the description of the second exemplary embodiment, a configuration identical or equivalent to that of the first exemplary embodiment will be denoted by the same reference mark. The description already given for the first exemplary embodiment is omitted for the second embodiment.

Figure 7:
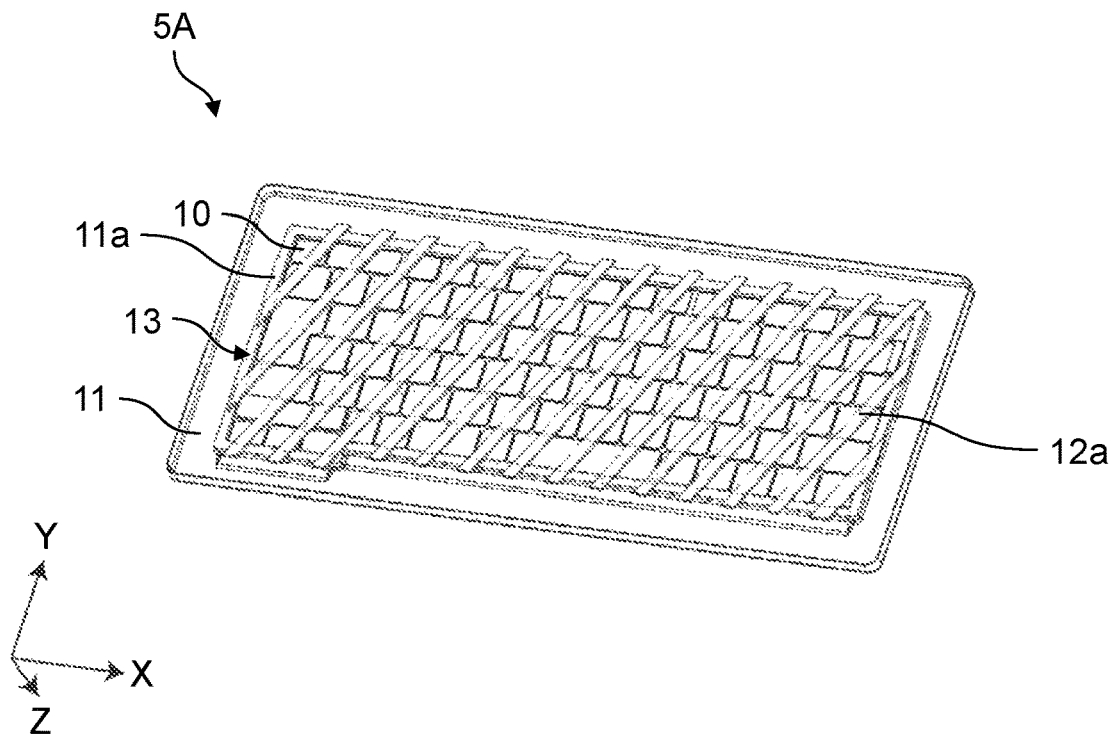
FIG. 7 is a schematic perspective view of an example of a keyboard unit of a second exemplary embodiment according to the present disclosure as viewed from a back side.

An example of a keyboard unit according to the second exemplary embodiment will be described with reference to FIG. 7. FIG. 7 is a schematic perspective view of an example of keyboard unit 5A of the second exemplary embodiment according to the present disclosure as viewed from a back side.

The second exemplary embodiment is different from the first exemplary embodiment in that the longitudinal direction of a plurality of retainers 12a obliquely intersects the longitudinal direction of keyboard 10.

As illustrated in FIG. 7, in keyboard unit 5A, the longitudinal direction of the plurality of retainers 12a obliquely intersects the longitudinal direction of keyboard 10. A plurality of keys of keyboard 10 are arranged so as to be shifted in an aligning direction. Specifically, the arrangement of a plurality of keys in the aligning direction is such that the keys aligned further on the lower side is further shifted by a little amount in a direction in the longitudinal direction from one end toward the other end of keyboard 10. Thus, by arranging the plurality of retainers 12a so as to obliquely intersect the longitudinal direction of keyboard 10, retainers 12a can be arranged to correspond to the arrangement of a plurality of keys of keyboard 10 in the aligning direction.

This configuration enables weight reduction while firmly retaining keyboard 10.

Third Exemplary Embodiment

An electronic device according to a third exemplary embodiment of the present disclosure will be described. The third exemplary embodiment will be described mainly on the points different from the first exemplary embodiment. In the description of the third exemplary embodiment, a configuration identical or equivalent to that of the first exemplary embodiment will be denoted by the same reference mark. The description already given for the first exemplary embodiment is omitted for the third exemplary embodiment.

Figure 8:
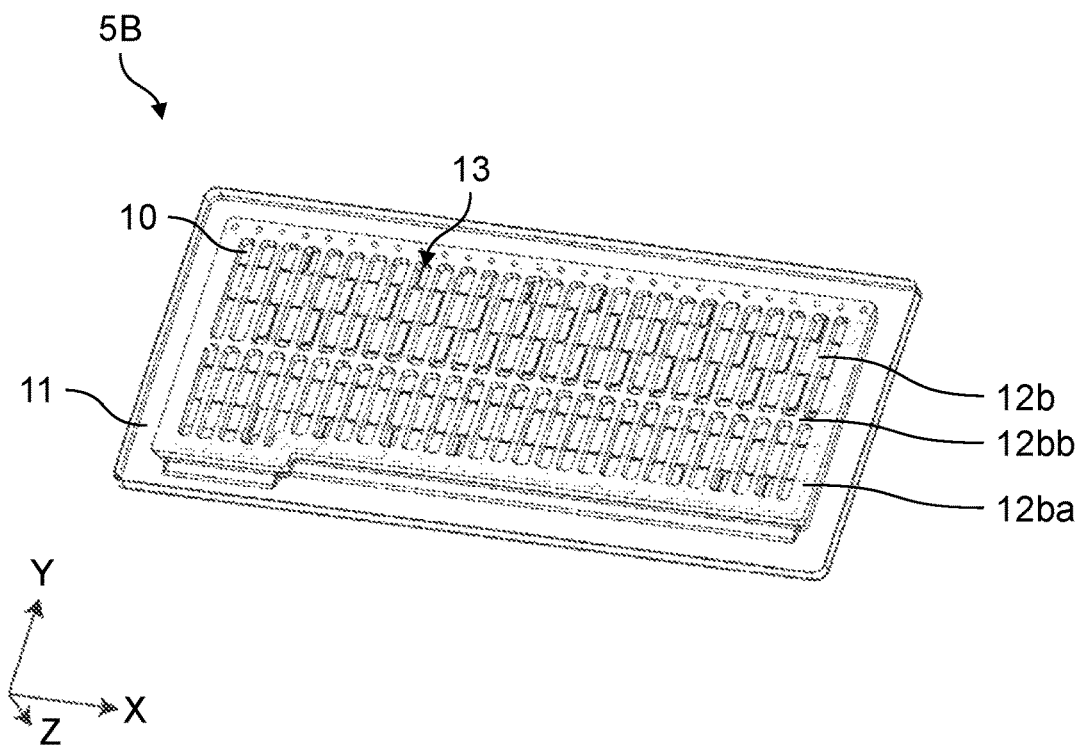
FIG. 8 is a schematic perspective view of an example of a keyboard unit of a third exemplary embodiment according to the present disclosure as viewed from a back side.

An example of a keyboard unit according to the third exemplary embodiment will be described with reference to FIG. 8. FIG. 8 is a schematic perspective view of an example of keyboard unit 5B of the third exemplary embodiment according to the present disclosure as viewed from a back side.

The third exemplary embodiment is different from the first exemplary embodiment in that the third exemplary embodiment includes outer peripheral connecting portion 12ba connected to both ends of a plurality of retainers 12b, and intermediate connecting portion 12bb connected to middle portions of the plurality of retainers 12b.

As illustrated in FIG. 8, keyboard unit 5B includes outer peripheral connecting portion 12ba connected to both ends of the plurality of retainers 12b, and intermediate connecting portion 12bb connected to middle portions of the plurality of retainers 12b. In the third exemplary embodiment, the plurality of retainers 12b, outer peripheral connecting portion 12ba, and intermediate connecting portion 12bb are integrally formed.

Outer peripheral connecting portion 12ba is a frame-shaped member connected to both ends of the plurality of retainers 12b. Outer peripheral connecting portion 12ba is, for example, a continuous plate-like member. Outer peripheral connecting portion 12ba is formed in a rectangular shape as viewed along the height direction (Z direction) of keyboard unit 5D.

Intermediate connecting portion 12bb is a plate-shaped member connected to middle portions of the plurality of retainers 12b. Intermediate connecting portion 12bb extends in the longitudinal direction of keyboard 10. In the first exemplary embodiment, intermediate connecting portion 12bb is connected to the central portions of the plurality of retainers 12b.

This configuration enables weight reduction while firmly retaining keyboard 10.

In the third exemplary embodiment, the example in which outer peripheral connecting portion 12ba is a frame-shaped member connected to both ends of the plurality of retainers 12b has been described, but the present disclosure is not limited to this configuration. For example, outer peripheral connecting portion 12ba may be a first plate-shaped member extending in the longitudinal direction of keyboard 10 and connected to one end of each of the plurality of retainers 12b, and a second plate-shaped member extending in the longitudinal direction of keyboard 10 and connected to the other end of each of the plurality of retainers 12b.

In the third exemplary embodiment, the example in which intermediate connecting portion 12bb is connected to central portions of the plurality of retainers 12b has been described, but the present disclosure is not limited to this configuration. Intermediate connecting portion 12bb may be connected to each of the plurality of retainers 12 at a portion between one end and the other end of retainer 12b.

In the third exemplary embodiment, the example in which outer peripheral connecting portion 12ba, intermediate connecting portion 12bb, and the plurality of retainers 12b are integrally formed has been described, but the present disclosure is not limited to this configuration. Outer peripheral connecting portion 12ba, intermediate connecting portion 12bb, and the plurality of retainers 12b may be formed separately.

Fourth Exemplary Embodiment

An electronic device according to a fourth exemplary embodiment of the present disclosure will be described. The fourth exemplary embodiment will be described mainly on the points different from the first exemplary embodiment. In the description of the fourth exemplary embodiment, a configuration identical or equivalent to that of the first exemplary embodiment will be denoted by the same reference mark. The description already given for the first exemplary embodiment is omitted for the fourth exemplary embodiment.

Figure 9:
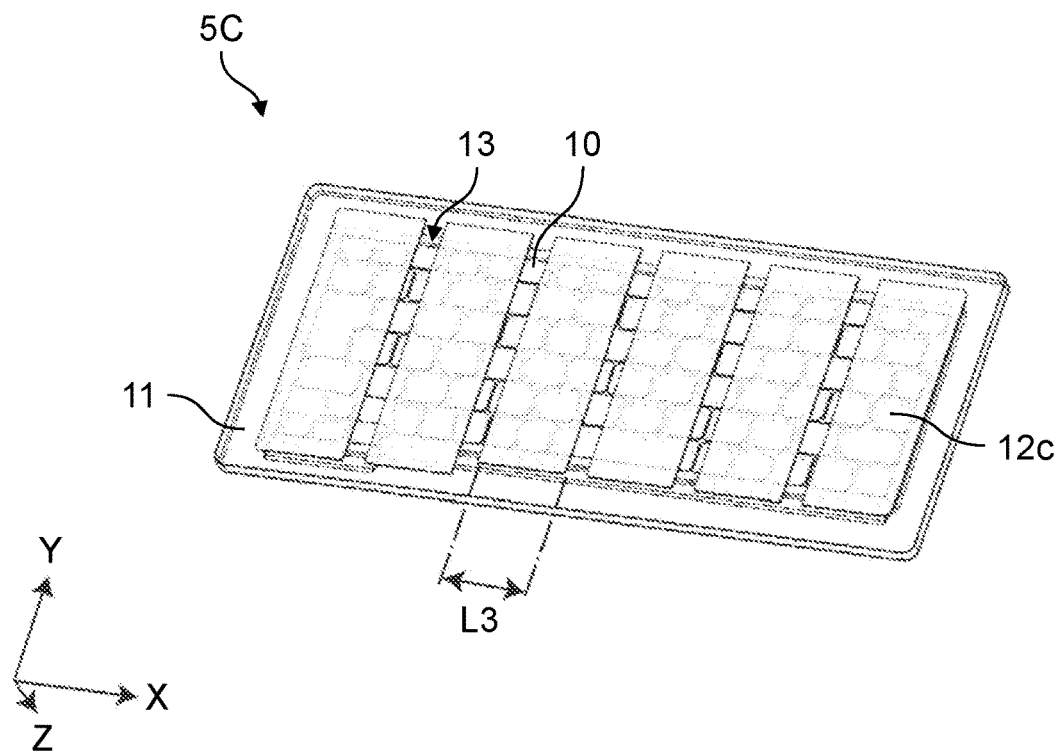
FIG. 9 is a schematic perspective view of an example of a keyboard unit of a fourth exemplary embodiment according to the present disclosure as viewed from a back side.

An example of a keyboard unit according to the fourth exemplary embodiment will be described with reference to FIG. 9. FIG. 9 is a schematic perspective view of an example of keyboard unit 5C of the fourth exemplary embodiment according to the present disclosure as viewed from a back side.

The fourth exemplary embodiment is different from the first exemplary embodiment in that width dimension L3 of each of a plurality of retainers 12c is larger than width dimension L1 of a key of keyboard 10.

As illustrated in FIG. 9, in keyboard unit 5C, width dimension L3 of each of the plurality of retainers 12c is larger than width dimension L1 of a key of keyboard 10. In other words, dimension L3 in the lateral direction of each of the plurality of retainers 12c is larger than dimension L1 in the width direction (X direction) of a key of keyboard 10.

In the fourth exemplary embodiment, width dimension L3 of retainer 12c is about two times larger than width dimension L1 of a key.

With this configuration, single retainer 12 can retain at least two keys, and firmness of keyboard unit 5C can be improved.

In the fourth exemplary embodiment, the example in which width dimension L3 of retainer 12c is about two times larger than width dimension L1 of a key has been described, but the present disclosure is not limited to this configuration. Width dimension L3 of retainer 12c may be any size larger than width dimension L1 of a key.

Fifth Exemplary Embodiment

An electronic device according to a fifth exemplary embodiment of the present disclosure will be described. The fifth exemplary embodiment will be described mainly on the points different from the first exemplary embodiment. In the description of the fifth exemplary embodiment, a configuration identical or equivalent to that of the first exemplary embodiment will be denoted by the same reference mark. The description already given for the first exemplary embodiment is omitted for the fifth exemplary embodiment.

Figure 10:
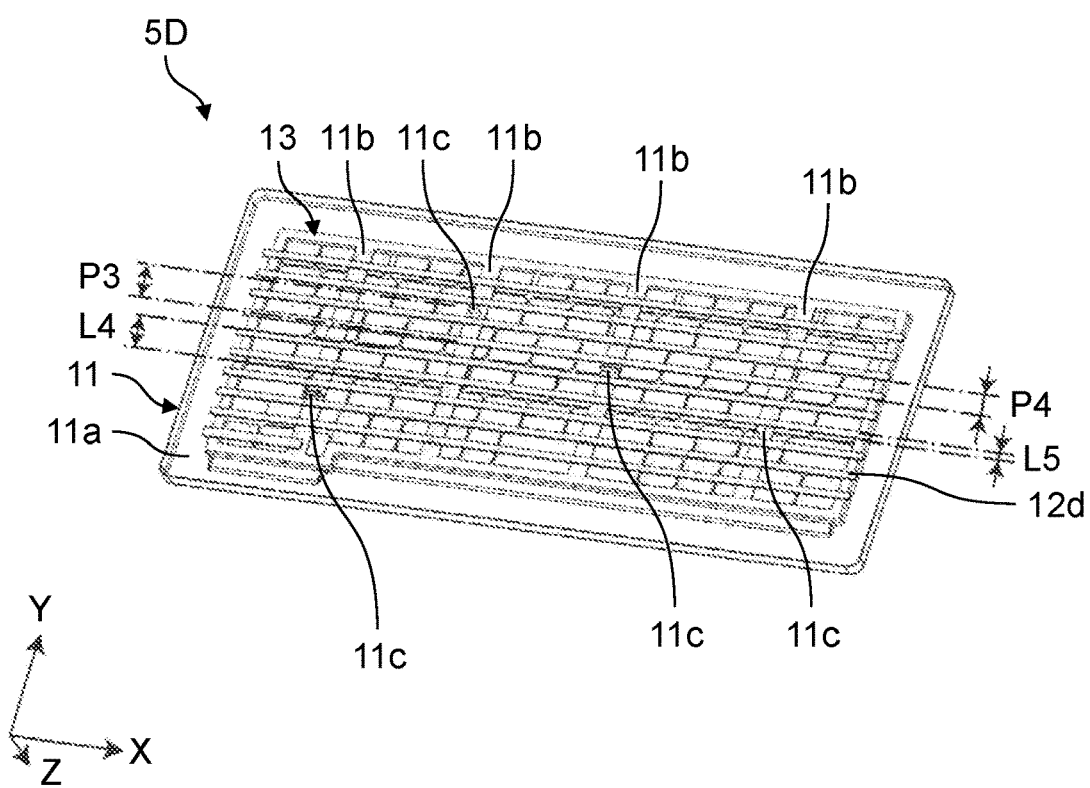
FIG. 10 is a schematic perspective view of an example of a keyboard unit of a fifth exemplary embodiment according to the present disclosure as viewed from a back side.

An example of a keyboard unit according to the fifth exemplary embodiment will be described with reference to FIG. 10. FIG. 10 is a schematic perspective view of an example of keyboard unit 5D of the fourth exemplary embodiment according to the present disclosure as viewed from a back side.

The fifth exemplary embodiment is different from the first exemplary embodiment in that the longitudinal direction of a plurality of retainers 12d is parallel to the longitudinal direction of keyboard 10, and that housing 11 includes base frame 11a and a plurality of internal frames 11b.

As illustrated in FIG. 10, the plurality of retainers 12d are each a plate-like member extending in the longitudinal direction of keyboard unit 5D. The plurality of retainers 12d each has a longitudinal direction that is the width direction (X direction) of keyboard unit 5D and a lateral direction that is the depth direction (Y direction) of keyboard unit 5D. Thus, the longitudinal direction of the plurality of retainers 12d is parallel to the longitudinal direction of keyboard 10.

The plurality of retainers 12d are arranged at an interval along the depth direction (Y direction) of keyboard unit 5, that is, the lateral direction of keyboard 10. The plurality of retainers 12d are arranged at interval P4 smaller than key pitch P3 in the lateral direction of keyboard 10. Accordingly, each of a plurality of keys of keyboard 10 is retained by at least one retainer 12d. As a result, keyboard 10 can be retained firmly, and the quality of key touch can be improved. That is, the feeling with which a user presses a key can be improved.

Length L5 in the lateral direction of each of the plurality of retainers 12d is smaller than depth dimension L4 of a key of keyboard 10. In the fifth exemplary embodiment, depth dimension L4 of a key of keyboard 10 is the dimension in the depth direction (Y direction) of a character key. Accordingly, each of a plurality of keys of keyboard 10 is further reliably retained by at least one retainer 12d, and at the same time, the weight of retainer 12 can be reduced.

Housing 11 includes base frame 11a and the plurality of internal frames 11b.

Base frame 11a is a frame-shaped member. The outer shape of base frame 11a is formed in a rectangular shape as viewed along the height direction (Z direction) of keyboard unit 5D.

The plurality of internal frames 11b are formed on inner walls of base frame 11a. The plurality of retainers 12d are arranged across the plurality of internal frames 11b. Specifically, the plurality of internal frames 11b are each a plate-like members extending from an inner wall of base frame 11a in the lateral direction of base frame 11a. In the fifth exemplary embodiment, the plurality of internal frames 11b extend in the depth direction (Y direction) of keyboard unit 5D, and are formed integrally with base frame 11a.

The plurality of internal frames 11b extend from an inner wall to another inner wall of base frame 11a. The plurality of internal frames 11b are disposed at an interval along the longitudinal direction of base frame 11a.

The plurality of internal frames 11b are in contact with the plurality of retainers 12d, thereby retaining retainers 12d. Thus, keyboard 10 can be held with the plurality of retainers 12d. Accordingly, keyboard 10 is retained by the plurality of retainers 12d and the plurality of internal frames 11b, whereby firmness of keyboard unit 5D can be improved.

The plurality of internal frames 11b are provided with positioning parts 11c. Positioning parts 11c are used, when arranging the plurality of retainers 12d, to position the plurality of retainers 12d. Positioning part 11c is, for example, a rib. By providing positioning parts 11c on the plurality of internal frames 11b described above, the plurality of retainers 12d can be easily disposed and connected to housing 11.

In the fifth exemplary embodiment, the example in which housing 11 includes the plurality of internal frames 11b has been described, but the present disclosure is not limited to this configuration. Housing 11 may have one or more internal frames 11b.

In the fifth exemplary embodiment, the example in which the plurality of internal frames 11b extend in the lateral direction of base frame 11a has been described. That is, the example in which the longitudinal direction of internal frame 11b is orthogonal to the longitudinal direction of retainer 12d has been described. However, the present disclosure is not limited to this configuration. The plurality of internal frames 11b may extend in the longitudinal direction of base frame 11a, or may extend obliquely with respect to the lateral direction or the longitudinal direction of base frame 11a.

Although the present disclosure has been fully described in connection with preferable exemplary embodiments with reference to the accompanying drawings, various modifications and changes are obvious to those skilled in the art. It is to be understood that such modifications and changes are included within the scope of the present disclosure according to the appended claims unless such modifications and changes depart from the scope of the present disclosure.

INDUSTRIAL APPLICABILITY

The present disclosure enables weight reduction of a keyboard unit, and thus is useful for an electronic device (for example, a laptop PC).

REFERENCE MARKS IN THE DRAWINGS 1 electronic device
2 body unit
3 display unit
4 hinge
5, 5A, 5B, 5C, 5D keyboard unit
6 touch pad
10 keyboard
11 housing
11a base frame
11b internal frame
11c positioning part
12, 12a, 12b, 12c, 12d retainer
13 through hole
12ba outer peripheral connecting portion
12bb intermediate connecting portion
14 through hole
15 screw
15a adhesive member

The invention claimed is:

1. An electronic device comprising:
a body unit; and
a keyboard unit disposed on the body unit, wherein the keyboard unit includes:
   a keyboard,
   a housing that has a frame shape and houses the keyboard, and
   a plurality of retainers connected to the housing and configured to retain the keyboard, and
   the plurality of retainers are formed of a material having a specific rigidity higher than a specific rigidity of the housing,
   wherein each of the plurality of the retainers has a plate shape having a longitudinal direction, and
   the plurality of retainers are arranged at an interval smaller than a key pitch of the keyboard.

2. The electronic device according to claim 1, wherein the longitudinal direction of the plurality of retainers intersects a longitudinal direction of the keyboard.

3. The electronic device according to claim 1, wherein a length in a lateral direction of each of the plurality of retainers is smaller than a width dimension or a depth dimension of a key of the keyboard.

4. The electronic device according to claim 1, wherein the plurality of retainers are connected to the housing by screws.

5. The electronic device according to claim 1, wherein the housing includes:
   a base frame having a frame shape, and
   one or more internal frames formed on an inner wall of the base frame, the plurality of retainers being disposed across the one or more internal frames.

6. The electronic device according to claim 1, wherein a material of the plurality of retainers is a fiber reinforced plastic.

7. The electronic device according to claim 1, wherein
   each of the plurality of retainers has a plate shape having a longitudinal direction,
   a material of the plurality of retainers has anisotropy in tensile strength, and
   the plurality of retainers has a tensile strength in the longitudinal direction larger than a tensile strength in a lateral direction of the plurality of retainers, the lateral direction being orthogonal to the longitudinal direction.

* * * * *